Nov. 8, 1955 J. S. ATKINS 2,722,821
MAGNETICALLY OPERATED LOCKING DEVICES
Filed July 30, 1951
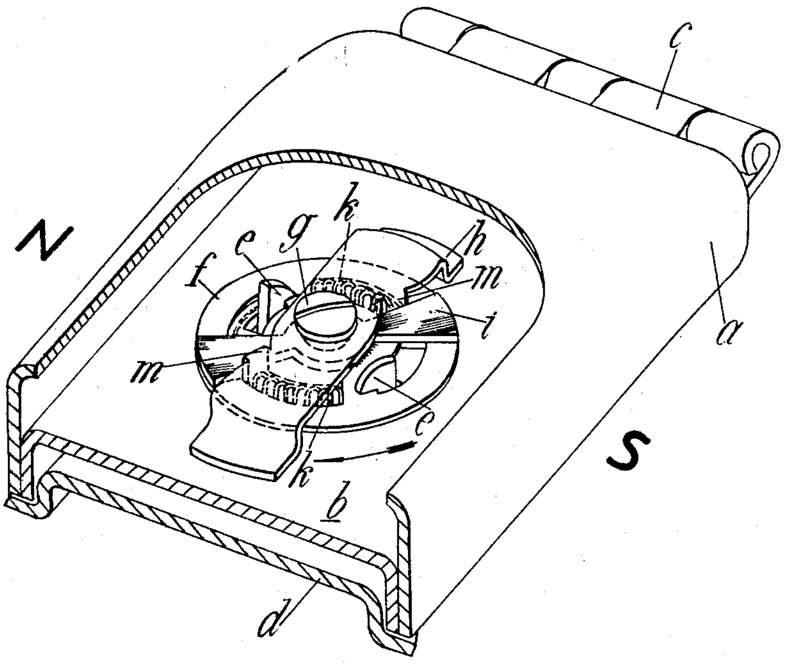
Inventor
J. S. Atkins
By Glascock Downing & Seebold
Attys

United States Patent Office 2,722,821

Patented Nov. 8, 1955

2,722,821

MAGNETICALLY OPERATED LOCKING DEVICES

John Stuart Atkins, Redditch, England, assignor to Alkaline Batteries Limited, Redditch, England, a British company Application July 30, 1951, Serial No. 239,256

Claims priority, application Great Britain August 10, 1950

2 Claims. (Cl. 70—162)

This invention relates to locking devices operated by an externally applied magnetic field.

The object of the present invention is to provide an improved compact locking device which cannot be operated otherwise than by a suitably applied magnetic field.

In accordance with this invention, the locking device comprises a disc of non-magnetic material adapted to turn about its axis and having at least one aperture for the passage of a hooked member, a strip of magnetic material extending diametrically across the disc, at least one spring for holding the disc in a position in which an edge of each said aperture engages the hooked member passing through the aperture so as to effect locking, the disc being turned against the spring by the attraction of a magnet for the strip of magnetic material in order to release the device.

To unlock the pegs from the disc, the poles of a horseshoe magnet are arranged to lie in a plane parallel to that of the disc and at equal distances from the axes of the disc. The poles are adjusted in a circular direction and carry the disc with them, due to the magnetic strip thereon, until the locking pegs are freed from the disc.

The arrangement can be readily used for locking the hinged lid of an apparatus, such as an electric accumulator, in its closed position. The locking and magnetic releasing arrangement is enclosed beneath the lid and so cannot be tampered with. It must be operated by an externally applied magnetic field.

The accompanying drawing shows a magnetic locking device in accordance with the invention, in perspective.

The device is shown as applied to a lid made in two parts *a, b,* secured together and leaving a space between them. The upper part *a* is shown broken away to expose the locking device which is contained in the space between the parts *a* and *b* and is not accessible from the outside. The lid is hinged at *c* to a stationary part *d* such as the cover of an electric accumulator.

On the part *d* are fixed two hooked pegs *e* which when the lid is closed as shown project through an opening or openings in the lower part *b* and through arcuate slots in a disc *f* of non-magnetic material which is rotatably mounted by means of a bolt *g* on a bridge piece *h* secured to the lid part *b* and bridging over the opening or openings therein. A strip *i* of magnetic material is carried by and extends diametrically across the disc *f*. There are two springs *k* which rest in arcuate slots in the disc *f*, each bearing against one end of the slot in the disc and against a lug *m* depending from the bridge piece *h*, so as to tend to rotate the disc in the direction opposite to that of the arrow.

When the lid is being closed the hooked ends of the pegs *e* acting on the edges of the slots, displace the disc *f* in the direction of the arrow, and then when the hooked ends have passed through the slots, the springs *k* turn the disc *f* back into the position shown in which the ends of the slots engage under the hooked ends and lock the lid.

To release the lock, a horseshoe magnet is used, the poles of which are placed over the upper part *a* of the lid above the disc *f* and at approximately equal distances from the axis of the disc, with the north and south poles respectively at the sides indicated by the corresponding letters. The magnet is rotated and by attracting the magnetic strip *i* it rotates the disc *f* against the springs *k*, so as to release the pegs *e*.

What I claim is:

1. A magnetic locking device for the hinged lid of a container, comprising in combination, a lid made of upper and lower parts secured together with a space between them, hooks upon the container which project through holes in the lower part of the lid into the space between the two parts of the lid, a bridge piece secured to the said lower part of the lid in the space between the two parts thereof, a pivot pin upon said bridge, a disc of non-magnetic material mounted to turn about said pivot in a plane parallel to the two parts of the lid, a strip of magnetic material carried by and extending diametrically across the said disc, the said hooks extending through arcuate slots in the disc and hooking over the upper side of the disc at an end of each slot, springs turning the disc to cause the ends of the slots to come beneath the hooks, the disc being turned about its axis and against the spring by manually turning a horseshoe magnet about the said axis, the magnet being positioned with its poles at approximately equal distances from the said axis and attracted to the strip of magnetic material, in order to release the disc and so the lid from the hooks.

2. A magnetic locking device as claimed in claim 1 in which the springs are located in arcuate slots in the disc and bear at one end against the disc and at the other end against a part on the bridge piece.

References Cited in the file of this patent

UNITED STATES PATENTS

| | | |
|---|---|---|
| 530,217 | Wolf | Dec. 4, 1894 |
| 1,022,072 | Gottschalck | Apr. 2, 1912 |
| 1,133,254 | Backus | Mar. 30, 1915 |
| 1,861,141 | Samburg | May 31, 1932 |

FOREIGN PATENTS

| | | |
|---|---|---|
| 1,076 | Great Britain | of 1910 |
| 765,061 | France | Mar. 19, 1934 |